(No Model.)
G. A. LINDGREN.
CHEMICAL FIRE EXTINGUISHER.
No. 323,170. Patented July 28, 1885.
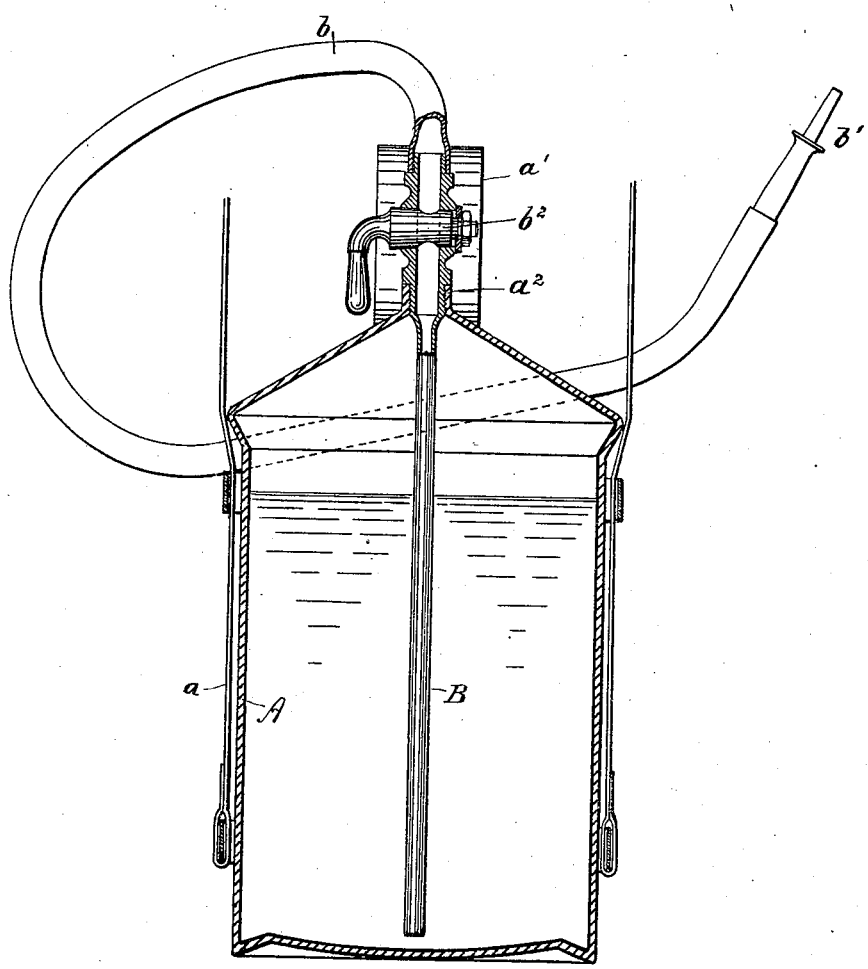
Witnesses:
L. Holmbor
C. C. Linthicum
Inventor
George A. Lindgren
By Prince Fisher
His Attorneys.

UNITED STATES PATENT OFFICE.

GEORGE A. LINDGREN, OF LA PORTE, INDIANA, ASSIGNOR OF ONE-HALF TO ELLSWORTH E. WEIR AND FRANKLIN R. CARSON, BOTH OF SAME PLACE.

CHEMICAL FIRE-EXTINGUISHER.

SPECIFICATION forming part of Letters Patent No. 323,170, dated July 28, 1885.

Application filed March 23, 1885. (No model.)

*To all whom it may concern:*

Be it known that I, GEORGE A. LINDGREN, of the city and county of La Porte, State of Indiana, have invented certain new and useful Improvements in Fire-Extingushers, of which the following is hereby declared to be a full, clear, and exact description, sufficient to enable others skilled in the art to make and use the same.

My invention relates to fire-extinguishers of the well-known Babcock pattern, wherein the extinguishing-liquid is retained within a closed vessel and is delivered therefrom under pressure onto the fire. Water alone has been used as the extinguishing-liquid, or in lieu thereof water containing in solution various chemicals, which practice has shown to be effective in subduing the flames. The propelling agent is ordinarily carbonic-acid gas, developed within the vessel under high tension at the time it is to be employed, said gas escaping with the liquid when the vent-cock is properly turned. Again, it has been proposed to use compressed air in forcing out the liquid, the air being pumped into the vessel and retained therein until the apparatus is brought into use. Although carbonic-acid gas is a powerful extinguisher, the manner of its delivery from the vessel causes the greater part of such gas to escape into the atmosphere before reaching the flames. Moreover, the pressure of the gas from within the vessel rapidly diminishes as the discharge proceeds, so that the latter portion of the liquid charge fails oftentimes of delivery into the fire. The same objections are encountered when compressed air is employed as the impelling medium for the stream of extinguishing-liquid, besides which, so far as the air reaches the fire at all, in conjunction with the liquid, it aids rather than hinders combustion. My invention is designed to obviate these difficulties; and it consists in providing fire-extinguishing vessels of the class named with a charge of ammonium gas, said gas being either liquefied or retained in solution under pressure therein, and being used either alone or in conjunction with a charge of water or of chemical salts contained in solution within the vessel.

In the accompanying drawing, which exhibits one form of apparatus to be used in the practice of my invention, A denotes the storing-vessel of convenient portable size, and made, preferably, from stout metal, sufficiently strong to withstand a pressure of, say, one hundred pounds to the square inch. There are the usual straps, $a$, and a handle, $a'$, attached to the vessel to aid in its easy manipulation. Through the threaded neck $a^2$ extends the siphon-tube B, which terminates within near the vessel bottom, and at its opposite end has attached thereto flexible hose $b$, fitted with the ordinary nozzle, $b'$. A stop-cock, $b^2$, controls the communication through the tube B to and from the interior of the vessel.

In ordinary practice, having filled the vessel, about as indicated in the drawing, with water containing a solution of the chlorides of sodium and ammonium in proportion, respectively, of four-sevenths ounce of the former and eight-sevenths ounce of the latter to one gallon of water, the vessel is in readiness to receive the charge of ammonium gas.

It may be noted that the presence of the salts named, or others of like nature, while not inimical chemically to the ammonium gas, contributes to the effectiveness of the solution as an extinguisher, and acts, moreover, to maintain the solution in liquid condition during the severe exposure of winter weather. This latter safeguard is important, since otherwise the apparatus might be rendered useless at a time when most needed for service.

If desired, the interior of the vessel may be coated, enameled, or lined to guard against corrosion, and like precaution may be taken with respect to the siphon-tube, stop-cock, and attachments, so far as the same are exposed to the action of the charge.

The hose $b$ being detached from the end of tube B, and said tube being tightly fitted to position in the neck $a^2$, it is merely necessary to connect said tube B by a convenient conduit or pipe with the source of supply from whence the ammonium gas is derived. Such gas may be developed in any convenient and well-known manner—as, for example, by heating together a mixture of ammonic chloride and caustic lime, as usually practiced.

The ammonium gas may be allowed to come freely and directly by the conduit from the retort or like appliance wherein it is generated, or else a force-pump may be interposed or connected up with the conduit, so as to exhaust from the retort and compress the gas into the receiver or vessel. A gage may be attached to the conduit or at other convenient point to regulate the supply and pressure of the gas to the receiver. On entering the vessel the gas is greedily absorbed by the liquid, and so continues until the point of saturation is reached, when the liquid will contain many times its volume of this powerful extinguishing-gas. The supply is continued thereafter until a pressure of some forty or fifty pounds to the square inch is obtained, which, when found to remain constant, completes the charging of the vessel. Stop-cock $b^2$ is closed, the hose $b$, in lieu of the pipe or conduit, is attached to the tube B, and the apparatus is now in readiness for use. Obviously, by providing a sufficient supply of the ammonium gas, and having several branch conduits delivering to as many vessels, it is practicable to cheaply and rapidly charge all of these at a single setting of the appliances.

Instead of having a volume of water within the vessel A, the sodic and ammonic chlorides may be dropped therein as dry salts, if desired, and the ammonium gas be forced into the receiver under such conditions of pressure and temperature as will effect its direct liquefaction. This produces in concentrated form a most powerful extinguisher, capable of cooling and quenching an immense surface of burning material when projected thereon.

Quite aside, however, from the extinguishing qualities of the ammonium gas, it is to be noted that either in solution or in liquefied condition, as the case may be, it is thus bodily retained in large measure until it reaches the flame, so far distinguishing itself in practical function from the carbonic-acid gas heretofore employed. Moreover, when the stop-cock is turned to release the charge, the consequent diminution in pressure causes a portion of the ammonium gas which had been liquefied or supercharged to pass at once into gaseous form within the vessel, so that with each descent of one pound in internal pressure upon the receiver there are being constantly developed therein fresh volumes of gas to act elastically as the impelling medium. By this peculiar quality of the ammonium gas, the requisite force of projection is more constantly maintained until the vessel is emptied, than in any of the types heretofore adopted.

Manifestly the invention is not restricted in benefit to any one form, size, special construction, or material for the receiving-vessel, nor to any one particular mode of generating or storing the ammonium gas therein.

Having thus described the invention, what I claim as new, and desire to secure by Letters Patent, is—

1. A fire-extinguisher, consisting of the usual strong vessel or receiver having controllable outlet and containing a charge of ammonium gas therein under pressure, substantially as described.

2. A fire-extinguisher, consisting of the usual strong vessel or receiver having controllable outlet and containing a charge of ammonium gas in liquefied or anti-freezing solution therein, said gas serving as the impelling-motor to deliver the charge onto the fire, substantially as described.

Done at La Porte, Indiana, this 18th day of March, A. D. 1885.

GEORGE A. LINDGREN.

Witnesses:
EDWARD MOLLOY,
A. L. OSBORN, Jr.